(12) United States Patent
Ehara

(10) Patent No.: US 12,148,955 B2
(45) Date of Patent: Nov. 19, 2024

(54) SECONDARY BATTERY

(71) Applicant: Prime Planet Energy & Solutions, Inc., Tokyo (JP)

(72) Inventor: Tsuyoshi Ehara, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 119 days.

(21) Appl. No.: 17/505,560

(22) Filed: Oct. 19, 2021

(65) Prior Publication Data

US 2022/0123446 A1 Apr. 21, 2022

(30) Foreign Application Priority Data

Oct. 20, 2020 (JP) ................. 2020-176041

(51) Int. Cl.
*H01M 50/562* (2021.01)
*H01M 10/42* (2006.01)
*H01M 50/103* (2021.01)
*H01M 50/176* (2021.01)
*H01M 50/552* (2021.01)

(52) U.S. Cl.
CPC ....... *H01M 50/562* (2021.01); *H01M 10/425* (2013.01); *H01M 50/103* (2021.01); *H01M 50/176* (2021.01); *H01M 50/552* (2021.01)

(58) Field of Classification Search
CPC ............. H01M 50/562; H01M 50/176; H01M 50/103; H01M 10/425; H01M 50/552; Y02E 60/10
See application file for complete search history.

(56) References Cited

U.S. PATENT DOCUMENTS

| | | | |
|---|---|---|---|
| 6,045,944 A | 4/2000 | Okada et al. | |
| 2004/0023108 A1 | 2/2004 | Nakanishi et al. | |
| 2011/0200870 A1* | 8/2011 | Kim ............ | H01M 50/567 429/179 |
| 2015/0214516 A1* | 7/2015 | Jang ............ | H01M 50/505 429/181 |
| 2016/0254517 A1 | 9/2016 | Tsunaki et al. | |

(Continued)

FOREIGN PATENT DOCUMENTS

| | | |
|---|---|---|
| CN | 102157712 A | 8/2011 |
| CN | 202758938 U | 2/2013 |

(Continued)

*Primary Examiner* — Jonathan G Jelsma
(74) *Attorney, Agent, or Firm* — HAUPTMAN HAM, LLP

(57) ABSTRACT

A secondary battery herein disclosed includes a power generating element, a battery case, and an electrode terminal. The electrode terminal includes a terminal part, an external connection part, and a molding resin part. The terminal part is connected to the power generating element. The external connection part contacts with the terminal part. The molding resin part covers the periphery of the connection surface between the external connection part and the terminal part in a state where a part of the external connection part is exposed to outside. The external connection part includes a step part between an outer circumferential portion of a connection surface between the external connection part and the terminal part, and an exposed part exposed from the molding resin part to the outside. The molding resin part covers both the outer circumferential portion of the connection surface and the step part.

10 Claims, 3 Drawing Sheets

(56) References Cited

U.S. PATENT DOCUMENTS

| | | | |
|---|---|---|---|
| 2017/0229700 A1* | 8/2017 | Matsumoto | ......... H01M 50/176 |
| 2019/0044107 A1 | 2/2019 | Ito | |
| 2020/0075923 A1* | 3/2020 | Takabayashi | ....... H01M 50/176 |

FOREIGN PATENT DOCUMENTS

| | | | | |
|---|---|---|---|---|
| CN | 104810498 | A | 7/2015 | |
| CN | 105830253 | A | 8/2016 | |
| CN | 108701804 | A | 10/2018 | |
| CN | 110875462 | A | 3/2020 | |
| JP | H11273658 | A | 10/1999 | |
| JP | 2001-274498 | A | 10/2001 | |
| JP | 2002-289156 | A | 10/2002 | |
| JP | 2004-71265 | A | 3/2004 | |
| JP | 2004247244 | A | 9/2004 | |
| JP | 2007134233 | A | 5/2007 | |
| JP | 201160880 | A | 3/2011 | |
| JP | 5476794 | B2 | 4/2014 | |
| JP | 2015141896 | A | 8/2015 | |
| JP | 201658215 | A | 4/2016 | |
| JP | 2018-196974 | A | 12/2018 | |
| JP | 2020-107473 | A | 7/2020 | |
| WO | WO-2015040998 | A1 * | 3/2015 | ............. C23C 22/52 |

\* cited by examiner

SECONDARY BATTERY

CROSS-REFERENCE TO RELATED APPLICATIONS

The present application claims the priority based on Japanese Patent Application No. 2020-176041 filed on Oct. 20, 2020, the entire contents of which are incorporated in the present specification by reference.

BACKGROUND OF THE INVENTION

1. Field of the Invention

The present teaching relates to a secondary battery including an electrode terminal for extracting electric power to the outside.

2. Description of the Related Art

A secondary battery has been widely used as a portable power supply for a personal computer, a portable terminal, or the like, or a power supply for driving automobiles such as an EV (electric vehicle), a HV (hybrid vehicle), and a PHV (plug-in hybrid vehicle). For a secondary battery, an electrode terminal is used for electrically connecting a power generating element, accommodated inside a battery case, to the outside. When a secondary battery is used, the conductive part communicating with the outside is required to be brought into contact with the electrode terminal.

Herein, when the metal of the electrode terminal at a portion thereof in contact with the conductive part is different from the metal of the conductive part, electrolytic corrosion may be caused at the connection portion between the electrode terminal and the conductive part, whereby the resistance may increase. For example, with the battery according to Japanese Patent Application Publication No. 2004-71265, a coating layer formed of the same material as that of the conductive part is closely bonded to the surface of the terminal by clad joining or plating, thereby suppressing the electrolytic corrosion at the connection portion between the terminal and the conductive part.

SUMMARY

However, even when the coating layer is closely bonded to the surface of the terminal by clad joining, plating, or the like, moisture or the like may enter the gap between the surface of the terminal and the coating layer, whereby corrosion may be caused. Therefore, with a conventional secondary battery, it has been difficult to properly suppress the occurrence of corrosion at the electrode terminal.

It is a typical object of the technology herein disclosed to provide a secondary battery capable of properly suppressing the occurrence of corrosion at the electrode terminal.

A secondary battery of one aspect herein disclosed includes: a power generating element; a battery case for accommodating therein the power generating element; and a plurality of electrode terminals electrically connected with the power generating element and exposed to outside of the battery case. At least any of the electrode terminals includes: a terminal part made of a metal and connected with the power generating element; an external connection part formed of a different metal from the metal of the terminal part and in contact with the terminal part; and a molding resin part covering a periphery of a connection surface between the external connection part and the terminal part in a state where a part of the external connection part is exposed to outside. The external connection part includes a step part between an outer circumferential portion of the connection surface between the external connection part and the terminal part, and an exposed part exposed from the molding resin part to the outside, and the molding resin part covers both the outer circumferential portion of the connection surface and the step part.

The secondary battery in accordance with the present disclosure, the outer circumferential portion of the contact surface between the external connection part and the terminal part is covered with the molding resin part. Therefore, the possibility is reduced that water or the like may enter the boundary between the external connection part and the terminal part. Further, a step part is formed between the contact surface and the exposed part in the external connection part, and the step part is also covered with the molding resin part. Accordingly, as compared with the case where a step part is not provided, the possibility is further reduced that water or the like may enter the boundary between the external connection part and the terminal part through the gap between the molding resin part and the exposed part. As a result, the occurrence of corrosion in the electrode terminal is properly suppressed.

When the axis connecting the center of the connection surface and the center of the exposed part is the central axis of the external connection part, the step part may be in a shape dented toward the central axis side. In this case, the step part properly reduces the possibility that water or the like may reach the boundary between the external connection part and the terminal part.

In accordance with one effective aspect of the secondary battery herein disclosed, a microscopic concave and convex part is formed on at least a part of a joint surface, to which the molding resin part is joined, of the external connection part and the terminal part. Therefore, as compared with the case where a microscopic concave and convex part is not formed on the joint surface, the junction strength of the molding resin part formed by injection molding or the like with respect to the joint surface is improved. As a result, the possibility is further reduced that water or the like may enter the boundary between the external connection part and the terminal part.

Incidentally, the dimensional unit of the microscopic concave and convex part in the present disclosure is of the order of nanometer, so that the effect of sufficiently improving the joint strength of the molding resin part (the so-called Nano-Anchor Effect) is caused. However, the dimensional unit of the microscopic concave and convex part may be of a larger order (e.g., micrometer order) than the nanometer order. Even in this case, as compared with the case where a microscopic concave and convex part is not formed, the joint strength of the molding resin part is improved.

In accordance with one effective aspect of the secondary battery herein disclosed, the external connection part and the terminal part are joined with each other by rolling. In other words, the external connection part and the terminal part serve as a cladding part joined by rolling. Therefore, even if water or the like may also pass through the step part, and may reach the boundary between the external connection part and the terminal part, water or the like is less likely to penetrate into the inside of the boundary. Accordingly, the effect of corrosion at the boundary between the external connection part and the terminal part is further suppressed.

Incidentally, the external connection part and the terminal part may be joined with each other by other joining methods than rolling (e.g., welding or ultrasonic welding). Also in this case, as compared with the case where the external connection part and the terminal part are not joined with each other, the effect of corrosion is properly suppressed. Further, the external connection part and the terminal part are not required to be joined with each other. Also in this case, the outer circumferential portion of the connection surface and the step part are both covered with the molding resin part, thereby properly suppressing the occurrence of corrosion at the boundary between the external connection part and the terminal part.

In accordance with one effective aspect of the secondary battery herein disclosed, when a direction along an outer circumference of the connection surface is a circumferential direction of the external connection part, the step part is formed continuously in the circumferential direction. In this case, as compared with the case where the step part is formed only in a part of the circumferential direction, the possibility is further reduced that water or the like may enter the boundary between the external connection part and the terminal part through the gap between the molding resin part and the exposed part.

In accordance with one effective aspect of the secondary battery herein disclosed, the exposed part is arranged further upward than the connection surface, and the step part includes: a first step part dented further downward than an exposed surface at an upper part of the exposed part; and a ring-shaped second step part surrounding an outer circumference of the first step part and protruding further upward than the first step part. In this case, even if water or the like may enter the gap between the exposed part and the molding resin part, the entered water or the like tends to be accumulated in the first step part formed more inward than the second step part, and hence is less likely to reach the boundary between the external connection part and the terminal part. Accordingly, the possibility is further reduced that water or the like may enter the boundary between the external connection part and the terminal part.

In accordance with one effective aspect of the secondary battery herein disclosed, when an axis connecting a center of the connection surface and a center of the exposed part is a central axis of the external connection part, a connection surface connecting the first step part and the second step part is an inclined surface inclined in the direction approaching the central axis side gradually and upward. In this case, even if water or the like is accumulated in the first step part, water or the like is further suppressed by the inclined surface from crossing the second step part from the first step part, and reaching the boundary between the external connection part and the terminal part. Further, the joint strength between the molding resin part and the external connection part is also improved by the inclined surface.

However, it is also possible to change the configuration of the step part. For example, it is also possible to form the step part as one step. Further, when the first step part and the second step part are provided, the connection surface connecting the first step part and the second step part may be formed as a surface in parallel with the central axis.

DETAILED DESCRIPTION OF THE PREFERRED EMBODIMENTS

Below, one of typical embodiments in the present disclosure will be described in details by reference to the accompanying drawings. The matters other than matters particularly mentioned in this specification, and required for practicing the present invention can be grasped as design matters of those skilled in the art based on the related art in the present field. The present teaching can be executed based on the contents disclosed in the present specification, and the technical common sense in the present field. Incidentally, in the following accompanying drawings, the members/parts providing the same effect are given the same numerals and signs. Further, the dimensional relation (such as length, width, or thickness) in each drawing does not reflect the actual dimensional relation.

In the present specification, the term "battery" is a term denoting an electric storage device capable of extracting the electric energy in general, and is a concept including a primary battery and a secondary battery. The term "secondary battery" denotes an electric storage device capable of repeatedly charging and discharging in general, and includes a capacitor (i.e., a physical battery) such as an electric double layer capacitor other than a so-called storage battery such as a lithium ion secondary battery, a nickel hydrogen battery, or a nickel cadmium battery (i.e., a chemical battery). Below, by taking a flat square-shaped lithium ion secondary battery of one kind of a secondary battery as an example, a secondary battery in accordance with the present disclosure will be described in details. However, it is not intended that the secondary battery in accordance with the present disclosure is limited to those described in the following embodiments.

Figure 1:
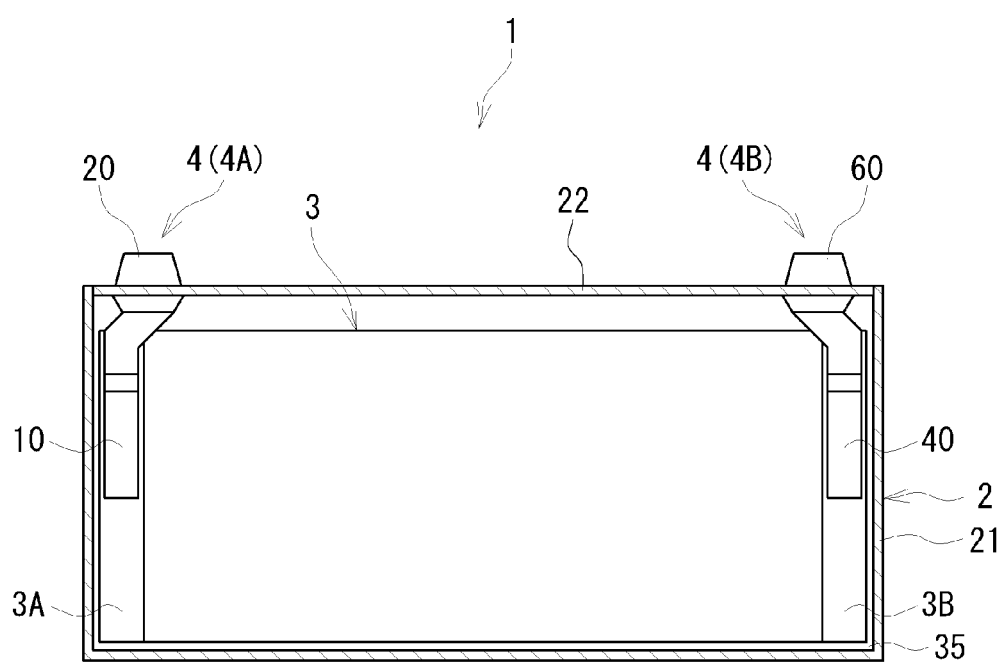
FIG. 1 is a partial cross sectional view showing a configuration of a secondary battery 1 in accordance with one embodiment.

Referring to FIG. 1, the overall configuration of a secondary battery 1 in accordance with the present disclosure will be described. The secondary battery 1 shown in FIG. 1 is a lithium ion secondary battery, and has a battery case 2, an electrode body (corresponding to a power generating element) 3, and an electrolyte 35. The battery case 2 accommodates the electrode body 3 and the electrolyte 35 in a state enclosing them in the inside. The shape of the battery case 2 in the present embodiment is a flat square shape. The battery case 2 includes a box-shaped main body 21 having an opening at one end thereof, and a sheet-shaped lid member 22 for blocking the opening of the main body. The main body 21 and the lid member 22 are integrated with each other by welding or the like. As the material for the battery case 2, for example, a metal material which is lightweight and has a good thermal conductivity such as aluminum can be used. As one example, for the electrode body 3 in the present embodiment, a wound electrode body including long positive electrode body, negative electrode body, and separator stacked one on another, and wound therein is used. Further, for the electrolyte 35 in the present embodiment, a nonaqueous electrolyte containing a lithium salt is used.

The shape of the lid member 22 in the battery case 2 is a rectangular sheet shape. At the opposite ends in the longitudinal direction (the left and right direction in FIG. 1) of the lid member 22, a pair of electrode terminals 4 (a positive electrode terminal 4A and a negative electrode terminal 4B) are provided. Each of the pair of electrode terminals 4 is electrically connected with the electrode body 3 of a power generating element, and is exposed to the outside of the battery case 2. Particularly, at one end (the left end in FIG. 1) in the longitudinal direction of the lid member 22, the positive electrode terminal 4A is provided, and at the other end (the right end in FIG. 1), the negative electrode terminal 4B is provided.

The positive electrode terminal 4A has a terminal part 10, and a molding resin part 20 of the positive electrode. The terminal part 10 of the positive electrode is connected with the positive electrode 3A of the electrode body 3 in the inside of the battery case 2. Whereas, the terminal part 10 of the positive electrode extends through a through hole (not shown) formed in the lid member 22 to the outside of the battery case 2. In the present embodiment, the terminal part 10 of the positive electrode is formed of aluminum. Incidentally, the terminal part 10 may include a plurality of members. For example, the terminal part 10 of the positive electrode may include an external terminal extending to the outside of the battery case 2, and a collector terminal to be joined with the positive electrode 3A. The molding resin part 20 is formed of a resin having an insulating property. The molding resin part 20 covers the periphery of the top of the terminal part 10 with a part of the terminal part 10 (the top end face of the terminal part 10 in the present embodiment) exposed, thereby establishing an insulation between the terminal part 10 and the lid member 22. In the present embodiment, the molding resin part 20 is formed around a prescribed site of the terminal part 10 by injection molding. Incidentally, when the terminal part 10 includes a plurality of members, the molding resin part 20 may have a function of fixing the plurality of members at the terminal part 10.

Figure 2:
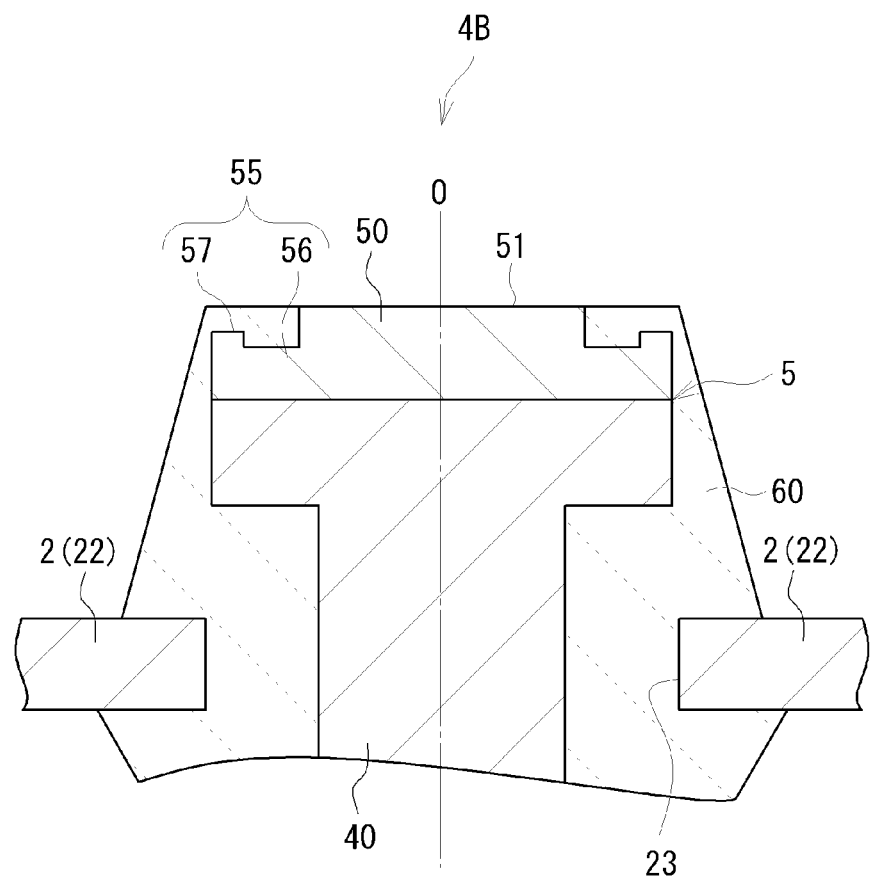
FIG. 2 is a longitudinal cross sectional view of a negative electrode terminal 4B in accordance with one embodiment.

Referring to FIG. 2, a configuration of the negative electrode terminal 4B in the present embodiment will be described in details. FIG. 2 is a longitudinal cross sectional view of the negative electrode terminal 4B in the secondary battery 1 in use. In the present embodiment, the vertical direction of the secondary battery 1 in use is in agreement with the vertical direction of FIG. 2. As shown in FIG. 2, the negative electrode terminal 4B includes a terminal part 40, an external connection part 50, and a molding resin part 60 of the negative electrode.

The terminal part 40 of the negative electrode is connected to the negative electrode 3B (see FIG. 1) of the electrode body 3 in the inside of the battery case 2. Further, the terminal part 40 extends through a through hole 23 formed in the lid member 22 to the outside of the battery case 2. In the present embodiment, the terminal part 40 of the negative electrode is formed of copper. Incidentally, the terminal part 40 may include a plurality of members. For example, the terminal part 40 may include an external terminal extending to the outside of the battery case 2, and a collector terminal to be joined with the negative electrode 3B. When the terminal part 40 includes a plurality of members, the molding resin part 60 may have a function of fixing the plurality of members in the terminal part 40.

The external connection part 50 is in contact with the terminal part 40. Particularly, the external connection part 50 of the present embodiment is in contact with the upper end face of the terminal part 40. A connection surface 5 between the external connection part 50 and the terminal part 40 is in a flat surface shape. Further, the external connection part 50 is in contact with the conductive part (not shown) communicating with the outside, thereby electrically connecting the secondary battery 1 with the outside. In the present embodiment, of the external connection part 50, an exposed part 51 (particularly, the exposed surface of the upper surface of the exposed part 51) exposed from the molding resin part 60 to the outside is in contact with the conductive part. The external connection part 50 is formed of a different metal from the metal (copper in the present embodiment) forming the terminal part 40. The metal forming the external connection part 50 is desirably the same as the material for the conductive part with which the exposed part 51 of the external connection part 50 is in contact. In this case, the possibility is reduced that electrolytic corrosion is caused at the contact portion between the exposed part 51 and the conductive part. In the present embodiment, the external connection part 50 is formed of aluminum.

A step part 55 is formed between the ring-shaped outer circumferential portion of the connection surface 5 between the external connection part 50 and the terminal part 40, and the exposed part 51 exposed from the molding resin part 20 to the outside, of the external connection part 50. When the axis connecting the center of the connection surface 5 and the center of the exposed part 51 is a central axis O of the external connection part 50, the step part 55 is in a shape dented toward the central axis O side. The detailed configuration of the step part 55 will be described later.

The molding resin part 60 is formed of a resin having an insulating property. The molding resin part 60 covers the periphery of prescribed sites of the external connection part 50 and the terminal part 40 with a part (the exposed part 51 of the upper end in the present embodiment) of the external connection part 50 exposed. As a result, an insulation is established between the negative electrode terminal 4B and the battery case 2 (lid member 22). Particularly, the molding resin part 60 covers the outer circumferential portion of the connection surface 5 between the external connection part 50 and the terminal part 40. Therefore, the possibility is reduced that water or the like may enter the boundary between the terminal part 40 and the external connection part 50. Further, the molding resin part 60 also covers the step part 55 of the external connection part 50 as well as the outer circumferential portion of the connection surface 5. Accordingly, as compared with the case where the external connection part 50 is not provided with the step part 55, the possibility is further reduced that the moisture or the like which has entered the gap between the molding resin part 60 and the exposed part 51 may reach the boundary between the terminal part 40 and the external connection part 50.

The molding resin part 60 is formed and joined at the periphery of the external connection part 50 and the terminal part 40 by injection molding. Therefore, as compared with the case where the molding resin part 60 is formed by another method, the gap between the external connection part 50 and the molding resin part 60, and the gap between the terminal part 40 and the molding resin part 60 are less likely to be formed. Accordingly, the possibility is further reduced that water or the like may reach the boundary between the terminal part 40 and the external connection part 50.

A microscopic concave and convex part is formed on at least a part of the joint surface to be joined with the molding resin part 60 of the surfaces of the external connection part 50 and the terminal part 40. The molding resin part 60 is formed by being injection molded to the joint surface having a microscopic concave and convex part. Therefore, the joint strength of the molding resin part 60 with respect to the joint surface is further improved by the microscopic concave and convex part. Accordingly, the possibility is further reduced that the moisture or the like may enter the boundary between the terminal part 40 and the external connection part 50. Incidentally, in the present embodiment, the dimensional unit of the microscopic concave and convex part formed on the joint surface is of the order of nanometer, so that the effect of sufficiently improving the joint strength of the molding resin part 60 (the so-called Nano-Anchor Effect) is caused.

The external connection part 50 and the terminal part 40 are joined with each other by rolling. In other words, the external connection part 50 and the terminal part 40 become the cladding part joined by rolling. Therefore, even if water or the like reach the boundary between the terminal part 40 and the external connection part 50, water or the like is less likely to permeate into the inside of the boundary. Accordingly, the effect of corrosion at the boundary is further suppressed. Incidentally, the step part 55 may be formed at the external connection part 50 by using the rolling force for rolling and joining the external connection part 50 and the terminal part 40.

The configuration of the step part 55 in the present embodiment will be described in details. The direction along the outer circumference of the connection surface 5 (i.e., the circumferential direction of the central axis O in FIG. 2) is the circumferential direction of the external connection part 50. The step part 55 is formed continuously (i.e., without a gap) in the circumferential direction. Therefore, as compared with the case where the step part is formed in a part of the circumferential direction, the possibility is further reduced that water or the like may enter the boundary between the terminal part 40 and the external connection part 50.

The exposed part 51 of the present embodiment is arranged above the connection surface 5. The step part 55 of the present embodiment includes a first step part 56 and a second step part 57. The first step part 56 is dented downward from the exposed surface at the upper part of the exposed part 51. The second step part 57 is formed in a ring shape on the outer circumferential side of the first step part 56, and protrudes to above the first step part 56. Therefore, even if water or the like enters the gap between the exposed part 51 and the molding resin part 60, the entered water or the like tends to be accumulated in the first step part 56 formed more inward than the second step part 57. Accordingly, moisture or the like is less likely to reach the boundary between the terminal part 40 and the external connection part 50.

Figure 3:
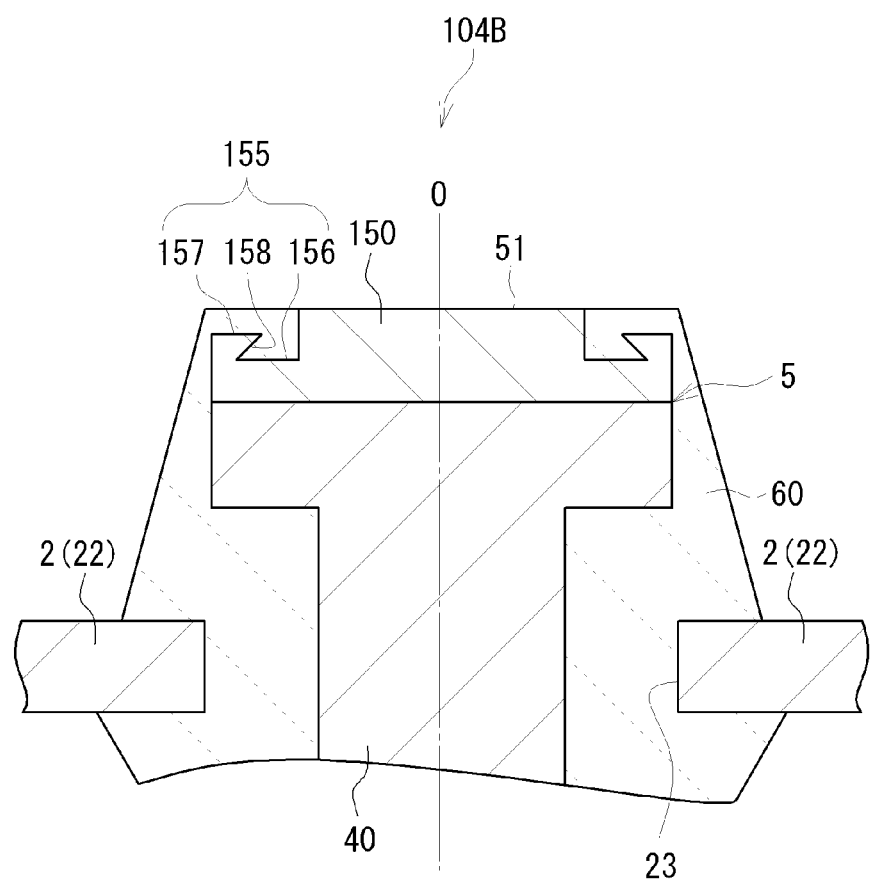
FIG. 3 is a longitudinal cross sectional view of a negative electrode terminal 104B in accordance with one embodiment (modified example).

Up to this point, a detailed description has been given by way of specific embodiments, which are merely illustrative, and is not construed as limiting the scope of the appended claims. The technology according to the appended claims includes various modifications and changes of the embodiments described up to this point. Referring to FIG. 3, one of the modified examples of the embodiment will be described. Of the negative electrode terminal 104B in the modified example of FIG. 3, only the shape of a step part 155 of an external connection part 150 is different from that of the negative electrode terminal 4B of the embodiment. For other configurations, the same configurations as those of the embodiment can be adopted. Therefore, other configurations than that of the step part 155 of the external connection part 150 are given the same numbers as those in the embodiment, and a description thereon is omitted. The external connection part 150 shown in FIG. 3 includes a first step part 156 and a second step part 157 as with the external connection part 50 of the embodiment. The first step part 156 is dented downward from the exposed surface at the upper part of the exposed part 51. The second step part 157 is formed in a ring shape on the outer circumferential side of the first step part 156, and protrudes to above the first step part 56. Further, a connection surface 158 between the first step part 156 and the second step part 157 is an inclined surface inclined in the direction approaching the central axis O side with approach upward. Therefore, even if water or the like is accumulated in the first step part 156, the inclined connection surface 158 further suppresses water or the like from crossing the second step part 157 from the first step part 156.

Further, the embodiment can also be additionally changed. For example, it is also possible to form the step part in the external connection part as one step. Also in this case, as compared with the case where the step part is not formed, the possibility is properly reduced that water or the like may enter the boundary between the terminal part 40 and the external connection part 50. Further, in the embodiment, for each negative electrode terminal 4B in a plurality of electrode terminals 4, the external connection part 50 having the step part 55 is used. However, the external connection part having the step part may be used for the positive electrode terminal 4A, and may be used for both of the pair of electrode terminals 4.

What is claimed is:

1. A secondary battery, comprising:
   a power generating element;
   a battery case for accommodating therein the power generating element; and
   a plurality of electrode terminals electrically connected with the power generating element and exposed to outside of the battery case,
   at least one of the plurality of electrode terminals including:
      a terminal part comprising a metal and connected with the power generating element;
      an external connection part comprising a different metal from the metal of the terminal part and in contact with the terminal part; and
      a molding resin part covering a periphery of a connection surface between the external connection part and the terminal part, wherein a part of the external connection part is exposed by the molding resin part, wherein
      the external connection part includes a step part between an outer circumferential portion of the connection surface of the external connection part and the part of the external connection part, wherein the step part is external to the battery case, and
      the molding resin part covers both the outer circumferential portion of the connection surface of the external connection part and the step part, wherein a center of the connection surface and a center of the part of the external connection part are concentric, and
      a central axis is an axis connecting the center of the connection surface and the center of the part of the external connection part, and the outer circumferential portion of the connection surface is farther, in a cross-sectional view, from the central axis than from a peripheral edge of the part of the external connection part.

2. The secondary battery according to claim 1, wherein a concave and convex part is on a part of a joint surface, to which the molding resin part is joined, of the external connection part and the terminal part.

3. The secondary battery according to claim 1, wherein the external connection part and the terminal part are joined with each other.

4. The secondary battery according to claim 1, wherein the step part is continuous along a circumferential direction of the external connection part along the outer circumference portion of the connection surface.

5. The secondary battery according to claim 1, wherein the part of the external connection part is further upward than the connection surface, and
the step part includes:
a first step part dented further downward than an upper part of the part of the external connection part; and
a ring-shaped second step part surrounding an outer circumference of the first step part and protruding further upward than the first step part.

6. The secondary battery according to claim 5, wherein a central axis of the external connection part is an axis connecting a center of the connection surface and a center of the exposed part, and a connection surface connecting the first step part and the second step part is inclined in a direction approaching the central axis side as a distance from the terminal part increases.

7. The secondary battery according to claim 1, wherein the connection surface is external to the battery case.

8. The secondary battery according to claim 1, wherein the molding resin part covers an entirety of the periphery of the connection surface along an outer circumference of the connection surface.

9. The secondary battery according to claim 1, wherein the molding resin part comprises an injection molding.

10. A secondary battery, comprising:
a power generating element;
a battery case for accommodating therein the power generating element; and
a plurality of electrode terminals electrically connected with the power generating element and exposed to outside of the battery case,
at least one of the plurality of electrode terminals including:
a terminal part comprising a metal and connected with the power generating element;
an external connection part comprising a different metal from the metal of the terminal part and in contact with the terminal part; and
a molding resin part covering a periphery of a connection surface between the external connection part and the terminal part, wherein a part of the external connection part is exposed by the molding resin part, wherein
the external connection part includes a step part between an outer circumferential portion of the connection surface of the external connection part and the part of the external connection part, wherein the step part is external to the battery case, and
the molding resin part covers both the outer circumferential portion of the connection surface of the external connection part and the step part, wherein a central axis is an axis connecting the center of the connection surface and the center of the part of the external connection part, and the outer circumferential portion of the connection surface is farther, in a cross-sectional view, from the central axis than from a peripheral edge of the part of the external connection part.

* * * * *